United States Patent Office 3,303,101
Patented Feb. 7, 1967

3,303,101
PROCESS OF PRODUCING D-RIBOSE-5-PHOS-
PHATE AND D-RIBOSE THROUGH FER-
MENTATION
Shukuo Kinoshita, Tokyo, and Kunizo Mizuhara and Takeo Suzuki, Machida-shi, Japan, assignors to Kyowa Hakko Kogyo Co., Ltd., Tokyo, Japan, a corporation of Japan
No Drawing. Filed July 17, 1964, Ser. No. 383,511
Claims priority, application Japan, July 29, 1963, 38/37,734; Aug. 8, 1963, 38/40,697
8 Claims. (Cl. 195—31)

This invention relates to a process for the production of D-ribose-5-phosphate and D-ribose by the culturing of microorganisms in appropriate media.

Ordinary processes hitherto in use for the manufacture of D-ribose-5-phosphate (e.g. from inosinic acid) and of D-ribose (e.g. by hydrolysis of yeast nucleic acid) depend on decomposition of substances related to ribonucleic acid, and hence are rather costly. No report has yet been made on the production of D-ribose-5-phosphate or D-ribose through direct fermentation with microorganisms.

The present invention is based on the observation that in fermentations carried out with a very wide variety of microorganisms in media containing relatively high concentrations of metallic salts, particularly potassium salts, magnesium salts and phosphates, a remarkably large amount of D-ribose-5-phosphate is accumulated in the fermentation fluid, and that the addition to the fermentation media of salts of such metals as manganese, iron and zinc in relatively high concentration, either singly or in combination, results in the formation and accumulation in the fermentation fluid of large amounts of D-ribose.

It has been found according to the present invention that the observation described in the preceding paragraph is not specific to any particular microorganism or strains, and that the invention is in fact applicable to strains of microorganisms belonging to the genera of Micrococcus, Brevibacterium, Aerobacter, Corynebacterium, Bacillus and so forth. Accordingly, the invention cannot be restricted to any particular microorganisms or to strains of any specific bacteriological classification. The invention is also applicable to nutrient-requiring mutants obtained by various mutation-inductive treatments.

The culture medium for use according to the invention can be any one which contains suitable amounts of saccharides and other carbon sources (e.g. glucose, starch, starch hydrolyzates, and molasses), nitrogen sources (e.g. urea, ammonium chloride, and ammonium nitrate), inorganic compounds (e.g. potassium phosphate, magnesium sulfate, manganese sulfate, zinc sulfate, iron sulfate, iron chloride, zinc chloride, and calcium chloride), and nitrogen-containing natural materials (e.g. corn steep liquor, yeast extract, meat extract, peptone, protein hydrolyzates, and fish meal). In the case of nutrient-requiring mutant strains, the necessary nutrient materials must be added, of course, to the media for the growth of these mutants. In order to produce D-ribose-5-phosphate, for example, a compound having a phosphate radical, magnesium salt, and potassium salt are added to the culture media, in concentrations greater than for media usually employed for bacterial fermentation, preferably in amounts equivalent to 0.2 to 2.0% by weight of a compound having a phosphate radical, 0.01 to 0.2% by weight of magnesium salt (as magnesium ions), and 0.1 to 1.5% by weight of potassium salt (as potassium ions).

For the formation of D-ribose, salts of such metals as manganese, iron, and zinc must be added, either singly or in mixtures, to the media so that there may be present in the media 0.001 to 1% w./v. of such metallic ions. The symbol "w./v." (percent "weight in volume") expresses the number of grams in 100 milliliters of solution.

According to the invention, the fermentation is effected aerobically, for example, with shaking or aerating fermentation device, at a culture temperature of 20° to 40° C. After a culturing period of 2 to 8 days, a remarkably large amount of D-ribose-5-phosphate or D-ribose is formed in the culture fluid and in the cells.

Upon completion of the fermentation, D-ribose-5-phosphate or D-ribose can be recovered by treatment with ion exchange resin, adsorption, precipitation and extraction, as described in the examples given below which are merely illustrative and in no way restrictive of the present invention. In these examples, percentages are by weight, unless otherwise indicated.

Example 1

*Brevibacterium ammoniagenes* ATCC No. 6872 is used for the fermentation. For the inoculum preparation, 30 milliliters of an aqueous culture medium containing 2% of glucose, 1% of peptone, 1% of yeast extract, and 0.25% of sodium chloride, is poured into a conical flask, sterilized, and the above strain is cultured with shaking in this medium at 30° C. for 24 hours. The fermentation medium having the following composition is prepared separately in the 250 milliliters flasks in 20 milliliters portions and sterilized, inoculated with above inoculum culture, and then is shaken following the inoculation for further culture at 30° C.:

Glucose _____ percent__ 10
Urea _____ do____ 1.0
$KH_2PO_4$ _____ do____ 1.0
$K_2HPO_4$ _____ do____ 1.0
$MgSO_4 \cdot 7H_2O$ _____ do____ 1.0
Biotin _____ γ/liter__ 30
$CaCl_2 \cdot 2H_2O$ _____ percent__ 0.01

Following the sterilization, the pH is adjusted to 8.0.

Thus, in the fermentation fluid cultured for 100 hours, 13.5 milligrams per milliliter of D-ribose-5-phosphate is accumulated. Accumulation of the same product is observed also in the cells.

From the fermentation fluid the cells are removed, and calcium hydroxide is added to one liter of the filtrate, and then the inorganic phosphate is centrifugally removed. The supernatant fluid is passed through a column of Dia-ion SA No. 21A (Cl-type) (polystyrene sulfonic acid type strongly acidic cation exchange resin, available from Mitsubishi Chemicals Co., Ltd., Japan) thereby to cause adsorption of D-ribose-5-phosphate. It is then eluted with 1 N aqueous NaOH, and the D-ribose-5-phosphate fraction is passed through a Dia-ion SK No. 1 (H-type) (polystyrene quaternary ammonium type strongly basic anion exchange resin, available from Mitsubishi Chemicals Co., Ltd., Japan) column, adjusted to pH 6.5, and then concentrated under reduced pressure. The concentrated solution is decolored with a small amount of active charcoal powder, adjusted to pH 8.0 with aqueous caustic soda and, with the addition of calculated amounts of barium acetate and then alcohol, the resultant barium salt of D-ribose-5-phosphate is allowed to settle down. The precipitate upon drying yields 18.4 grams of barium salt of D-ribose-5-phosphate ($BaC_5H_9O_8P \cdot 5\frac{1}{2}H_2O$), white in color.

Example 2

An aqueous seed culture medium comprising 2% of glucose, 1% of petone, 1% of yeast extract, and 0.25% of NaCl, and an aqueous fermentation medium comprising 10% of glucose, 0.3% of urea, 0.2% of $KH_2PO_4$, 0.1% of $K_2HPO_4$, and 0.01% of $CaCl_2 \cdot 2H_2O$ are used. *Micrococcus glutamicus* KY3803 (ATCC No. 15455) is cultured entirely in the same manner as in Example 1, except that 0.8% of KH₂PO₄ and 0.3% of K₂HPO₄ are added 48 hours after the start of fermentation. On the 120th hour, 8.9 milligrams of D-ribose-5-phosphate is accumulated per milliliter of the fermentation fluid. After removal of the cells from the fermentation fluid, 1 liter of the filtrate is subjected to the same steps as in Example 1, whereupon 11.2 grams of crystalline barium salt of D-ribose-5-phosphate are obtained.

*Example 3*

Brevibacterium ammoniagenes ATCC No. 6872 is used. 300 milliliters of the same seed culture medium as in Example 1 are poured into a 2-liter flask and sterilized, and then the above strain is cultured in this medium with shaking at 30° C. for 21 hours. A separately prepared fermentation medium is inoculated with about 10% by volume of the above culture fluid. 3 liters of the same fermentation medium as in Example 1 are poured in a 5 liter jar fermenter, and sterilized. In 72 hours of aerated culture with agitation, 20.5 milligrams of D-ribose-5-phosphate is accumulated per milliliter of the fermentation fluid. Accumulation of the compound is also noted in the cells.

After removal of the cells from the fermentation fluid, one liter of the filtrate is subjected to the same treatment as in Example 1, and gives 7.5 grams of barium salt of D-ribose-5-phosphate.

*Example 4*

Brevibacterium ammoniagenes ATCC No. 6872 is used. It is cultured with shaking in a seed culture medium containing 2% of glucose, 1% of peptone, 1% of yeast extract, and 0.25% of NaCl, in 30 milliliter portions in 250 milliliter conical flasks, at 30° C. for 24 hours. A below-mentioned fermentation medium which is poured in 20 milliliter portions into 250 milliliter conical flask, is inoculated with about 10% by volume of the above seed culture. The fermentation medium is also cultured with shaking at 30° C.

*Composition of fermentation medium.*—100 grams of glucose, 6 grams of urea, 10 grams of KH₂PO₄, 10 grams of K₂HPO₄, 10 grams of MgSO₄·7H₂O, 30γ of biotin, 0.1 gram of CaCl₂·2H₂O, and 2 grams of MnSO₄·4H₂O are dissolved in water to one liter, and the pH is adjusted to 8.0 prior to sterilization.

Thus, in the fermentation fluid cultured for 120 hours, 11 milligrams of D-ribose per milliliter are formed. Similar accumulation of D-ribose is observed in the cells as well. Glucose is consumed almost completely.

From this fermentation fluid, the cells are eliminated, and one liter of the filtrate is adjusted to pH 5.0 with hydrochloric acid, and then passed through a resin column of Dia-ion SK No. 1 (H-type).

Next, distilled water is introduced through the column, and ribose-containing fractions in the effluents are collected, and further passed through a column of Dia-ion SA No. 21A (OH-type) with the pH kept unchanged. The ribose fractions of the effluents are collected together, adjusted to pH 6.5, and then concentrated under reduced pressure at 50° C. The concentrated solution is decolored with active charcoal powder, and, with the addition of alcohol, allowed to stand in a cooling chamber. Ribose in crystalline form is obtained (yield, 8.6 grams).

*Example 5*

The same strain is used and the same culturing procedure is followed as in Example 1. Then, several types of metallic salts are added singly, and also manganese salts and other metallic salts are added in mixtures, to the culture medium prepared as above. The amounts of D-ribose accumulated after 96 hours of culture are as given in Table 1:

TABLE 1

| Type of metallic ion | Conc. of additive, Percent | D-ribose produced, milligrams/milliliter |
| --- | --- | --- |
| 0 | 0 | 0.08 |
| Fe⁺⁺ | 0.05 | 4.2 |
| Mn⁺⁺ | 0.05 | 7.9 |
| Co⁺⁺ | 0.05 | 0.0 |
| Ni⁺⁺ | 0.05 | 0.0 |
| Zn⁺⁺ | 0.05 | 3.0 |
| Mn⁺⁺+Fe⁺⁺ | 0.05+0.05 | 8.3 |
| Mn⁺⁺+Zn⁺⁺ | 0.05+0.05 | 7.7 |
| Mn⁺⁺+Co⁺⁺ | 0.05+0.05 | 0.0 |
| Mn⁺⁺+Ni⁺⁺ | 0.05+0.05 | 0.0 |

*Example 6*

With the same strain and under the same culture conditions as in Example 1, the amount of MnSO₄·4H₂O added to the medium is varied. 96 hours later, the amounts of accumulated D-ribose are as shown in Table 2:

TABLE 2

| Amount of Mn⁺⁺ added, percent: | Amount of D-ribose produced, milligrams/milliliter |
| --- | --- |
| 0 | 0.1 |
| 0.0001 | 2.0 |
| 0.0008 | 3.8 |
| 0.008 | 7.4 |
| 0.004 | 10.7 |
| 0.08 | 6.5 |
| 0.4 | 5.1 |
| 0.8 | 1.2 |

*Example 7*

The strain used is Micrococcus glutamicus KY 3803 (ATCC No. 15455). Fermentation procedure and the composition of the seed culture medium are followed as in Example 4.

The composition of fermentation medium is shown below.

*Composition of fermentation medium.*—100 grams of glucose, 3 grams of urea, 2 grams of KH₂PO₄, 1 gram of K₂HPO₄, 1 gram of MgSO₄·7H₂O, 10 grams of biotin, 0.1 gram of CaCl₂·2H₂O, and 2 grams of MnSO₄·4H₂O are dissolved in water to one liter, and the pH is adjusted to 8.0 before sterilization.

After 120 hours of culture, 8.2 milligrams of D-ribose is accumulated in each milliliter of the fermentation fluid.

The fermentation fluid is adjusted to pH 4.5, heated at 70° C. for 10 minutes, and centrifuged to eliminate the cells. From the resultant fluid, one liter of the supernatant fluid is separated, and adjusted to pH 7.8 with aqueous NaOH, and reacted with the addition of 50 grams of compressed bread yeast at 37° C. for 10 minutes to consume the residual glucose. The fluid is centrifuged, and the supernatant fluid is treated by the same method as described in Example 1. 5.7 grams of crystalline ribose are obtained.

*Example 8*

Bacillus cereus ATCC No. 9139 is cultured in a medium as described in Example 1, and displaced into the medium of the following composition, and further cultured for 102 hours, with the addition of Mn⁺⁺, and Zn⁺⁺ (0.05% and 0.02%, respectively). The amount of D-ribose accumulated is 7.1 milligram per milliliter of the fermentation fluid.

| | Percent |
| --- | --- |
| Glucose | 10 |
| K₂HPO₄ | 0.6 |
| MgSO₄·7H₂O | 0.6 |
| NH₄Cl | 0.7 |
| KH₂PO₄ | 0.6 |
| Yeast extract | 1.0 |

The D-ribose obtained above, upon the same treatment as in Example 4, yields 5.7 grams of crystalline ribose.

Example 9

*Brevibacterium ammoniagenes* ATCC No. 6872 is cultured in the same manner as in Example 1. The seed culture medium is poured into 2-liter conical flasks in portions of 150 milliliters, cultured with shaking for 18 hours, and then placed in 5-liter jar fermenters (in portions of 3 liters), where it is further cultured with an aeration volume of 3 liters/milliliter and with agitation of 400 r.p.m. The composition of the aqueous fermentation medium is: 10% of glucose; 1.0% of $KH_2PO_4$; 1.0% of $K_2HPO_4$; 1.0% of $MgSO_4 \cdot 7H_2O$; 100 γ/liter of biotin; 0.01% of $CaCl_2 \cdot 2H_2O$; 0.2% of urea; and 0.1% of $MnSO_4 \cdot 4H_2O$.

The pH of the fermentation fluid is adjusted suitably with urea. After 66 hours of culture, 12.7 milligrams of D-ribose is accumulated in each milliliter of the fermentation fluid. The D-ribose is treated in the same manner as in Example 1. 30 grams of D-ribose crystals is obtained.

What is claimed is:

1. A process of producing D-ribose-5-phosphate which comprises aerobically culturing a D-ribose-5-phosphate producing microorganism selected from the group consisting of *Micrococcus glutamicus*, *Brevibacterium ammoniagenes* and *Bacillus cereus* microorganisms in a saccharide-containing aqueous culture medium containing 0.20 to 2.0% by weight of phosphate (as phosphoric acid radical), 0.01 to 0.2% by weight of magnesium salt (as magnesium ion), at a pH in the range of pH 6.0 to 9.0 and at 20° to 40° C., whereby D-ribose-5-phosphate is directly produced and accumulated in the said fermentation medium, and 0.1 to 1.5% by weight of potassium salt (as potassium ion), and recovering accumulated D-ribose-5-phosphate.

2. A process of producing D-ribose which comprises aerobically culturing a D-ribose producing microorganism selected from the group consisting of *Micrococcus glutamicus*, *Brevibacterium ammoniagenes* and *Bacillus cereus* microorganisms in a saccharide-containing aqueous culture medium containing 0.01 to 0.2% by weight of magnesium salt (as magnesium ion) and 0.1 to 1.5% by weight of potassium salt (as potassium ion), said medium also containing 0.0001 to 1% (as ion) w./v. of at least one member selected from the group consisting of manganese, iron and zinc ions, at a pH in the range of pH 6.0 to 9.0 and at 20° to 40° C., whereby D-ribose is directly produced and accumulated in the said fermentation medium, and recovering accumulated D-ribose.

3. A process according to claim 1, wherein the microorganism is *Micrococcus glutamicus* ATCC No. 15455.

4. A process according to claim 1, wherein the microorganism is *Brevibacterium ammoniagenes* ATCC No. 6872.

5. A process according to claim 1, wherein the microorganism is *Bacillus cereus* ATCC No. 9139.

6. A process according to claim 2, wherein the microorganism is *Micrococcus glutamicus* ATCC No. 15455.

7. A process according to claim 2, wherein the microorganism is *Brevibacterium ammoniagenes* ATCC No. 6872.

8. A process according to claim 2, wherein the microorganism is *Bacillus cereus* ATCC No. 9139.

References Cited by the Examiner

Biochemical Journal, vol. 59, pp. 316–329, February 1955.

Methods in Enzymology, vol. III, pp. 188–190, 1957.

Journal of Biological Chemistry, vol. 234, No. 6, pp. 1369–1374.

A. LOUIS MONACEL, *Primary Examiner.*

ALVIN E. TANENHOLTZ, *Examiner.*